US007873352B2

(12) United States Patent
Nguyen et al.

(10) Patent No.: US 7,873,352 B2
(45) Date of Patent: Jan. 18, 2011

(54) FAST ROAMING IN A WIRELESS NETWORK USING PER-STA PAIRWISE MASTER KEYS SHARED ACROSS PARTICIPATING ACCESS POINTS

(75) Inventors: Hien Nguyen, Northborough, MA (US); Pierre Trudeau, Lorraine (CA); Anil Gupta, Shrewsbury, MA (US); Roger D. Sands, Princeton, MA (US); Thomas S. Stefanski, Westford, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 1218 days.

(21) Appl. No.: 11/430,547

(22) Filed: May 9, 2006

(65) Prior Publication Data

US 2006/0256763 A1 Nov. 16, 2006

Related U.S. Application Data

(60) Provisional application No. 60/679,368, filed on May 10, 2005.

(51) Int. Cl.
*H04M 1/66* (2006.01)
*H04W 36/00* (2009.01)
*H04W 4/00* (2009.01)

(52) U.S. Cl. ............... 455/411; 455/422.1; 455/436
(58) Field of Classification Search ............ 455/411, 455/436–444; 370/331–334
See application file for complete search history.

(56) References Cited

U.S. PATENT DOCUMENTS

2003/0224795 A1 * 12/2003 Wilhoite et al. ............ 455/445
2004/0242228 A1   12/2004 Lee et al.
2005/0117524 A1    6/2005 Lee et al.
2005/0254653 A1 * 11/2005 Potashnik et al. .......... 380/270
2006/0083377 A1 *  4/2006 Ptasinski ................... 380/270
2006/0133409 A1 *  6/2006 Prakash et al. ............. 370/450
2008/0049674 A1 *  2/2008 Cha et al. ................... 370/331

OTHER PUBLICATIONS

Mishra et al., "Pro-active distribution using neighbor graphs," IEEE Wireless Communications, vol. 11, Feb. 2004.
Mishra et al., "Context caching using neighbor graphs for fast handoffs in a wireless network," IEEE INFOCOM conference, Hong Kong, Mar. 2004.

* cited by examiner

*Primary Examiner*—Michael T Thier

(57) ABSTRACT

A fast roaming (handoff) service is provided for a WLAN infrastructure. A given mobile station (STA) obtains a pairwise master key (PMK) when it associates with an access point (AP) in the infrastructure. A neighbor graph identifies prospective APs to which the STA may then roam. At initialization, preferably the neighbor graph is fully-connected (i.e., each AP is assumed to be connected to every other AP). The PMK (obtained by the STA initially) is shared proactively with the neighbor APs as indicated in the neighbor graph. Thus, when the STA roams to a neighbor AP, because the PMK is already available, there is no requirement that the STA initiate a real-time request to an authentication server to re-associate to the new AP. Further, the new AP causes an update to the neighbor graph information implicitly by simply issuing a notification that it is now handling the STA that arrived from the prior AP; in this manner, the prior AP is confirmed as a neighbor, but there is no requirement for any inter-AP dialog before a given neighbor graph is updated. As roaming occurs the neighbor graph is pruned down (to reflect the actual neighbor AP connections) using the implicit notification data.

18 Claims, 5 Drawing Sheets

FAST ROAMING IN A WIRELESS NETWORK USING PER-STA PAIRWISE MASTER KEYS SHARED ACROSS PARTICIPATING ACCESS POINTS

CROSS-REFERENCE TO RELATED APPLICATION

This application is based on and claims priority from provisional application Ser. No. 60/679,368, filed May 10, 2005.

BACKGROUND OF THE INVENTION

1. Technical Field

The present invention relates generally to wireless device networking and in particular to a method for fast roaming in a wireless network wherein security keys are provided proactively to one or more neighbor access points to which a mobile device may be expected to move to within a given session.

2. Background of the Related Art

Wireless local area network (WLAN) technologies and services are well-known. WLAN is based on IEEE 802.11 standards. Users access the WLAN using mobile devices (e.g., dual-mode cell phones, laptops, PDAs with a Wi-Fi NIC, or the like), which are each referred to as a mobile station (STA). A Wi-Fi infrastructure typically comprises one or more access points (APs) located in proximity to one another, and each AP provides a given wireless service area. Typically, an access point is a device that acts as a central point between a wireless and a wired network. The original 802.11 standard required that wireless data be encrypted by a WEP (Wired Equivalent Privacy) algorithm and that the encryption key be fixed. Other standards provide for access control, security session management, dynamic key exchange and key management, as well as the use of different key encryption algorithms for protection of wireless data. For example, IEEE 802.1X provides a framework for user authentication and key exchange, and IEEE 802.11i describes a specific 4-way key exchange handshake method. As seen in FIG. 1, this key exchange typically involves the generation of a pairwise master key (PMK) that provides security between a STA 100 and an AAA (Authentication, Authorization and Accounting) server 104, and a pairwise transient key (PTK) that provides security between the STA and an AP 102. The PMK is generated by the AAA server, which provides a standard remote authentication dial-in user service (RADIUS). An AP and a STA generate the PTK from the PMK. As the STA roams throughout the infrastructure (e.g., moving from the service area of AP 102 to the service area of AP 106), a roaming service typically is used to attempt to provide the STA with continuous service.

A representative roaming service is shown in U.S. Patent Application No. 2004/0242228 A1, to Lee et al., filed Jan. 8, 2004, and titled "Method for fast roaming in a wireless network." In that patent application, a mobile device (STA) associates with an access point (AP), which then transmits proactive keys needed to enable the mobile device to roam to neighbor access points. An AP determines the neighbor access points by generating and maintaining a "neighbor graph," which is a graph that defines connections between a STA and its potential APs that the STA may associate with by roaming. As described, a connection between APs is drawn in an AP-neighborhood graph if there is a physical connection between the APs without passing through any other AP and the distance between the physically-connected APs does not exceed a given threshold. According to the basic technique described by Lee et al., an AP to which the STA is currently associated obtains a unique PMK for each AP in its neighbor graph to which the STA may roam, and then sends those PMKs to the respective neighbor APs proactively—i.e., before the STA roams away from the AP. Thus, when the STA does move to one of its neighbor APs, a re-association is carried out between the STA and the neighbor AP using the already provided proactive key. In an alternate embodiment, shown in FIGS. 2A-2D here, the system uses an authentication server (AS) to facilitate the PMK generation and an accounting server to trigger the proactive key transfer to the neighbor APs. The accounting server maintains the AP-specific neighbor graphs. Thus, in FIG. 2A, the STA is associated with AP A using the RADIUS-compliant AAA authentication server (AS) and obtains PMKA to secure the session. The STA then issues an accounting-request (start) message to the accounting server, which causes the accounting server to issue a notify-request message to each of the neighbor APs (B and E) identified in AP A's neighbor graph. This is shown in FIG. 2B. As a consequence, each of the neighbor APs (B and E) performs an authentication with the authentication server, which generates unique per-AP PMKs, namely, $PMK_B$ and $PMK_E$. As the STA roams (e.g., to AP B), its PMK (in this case $PMK_B$) is already available at the new AP, thus reducing the likelihood that that connection will be dropped as the STA re-associates with the new access point. The STA re-associates with the new AP by generating $PMK_B$ (using the MAC address of AP B) and obtaining a PTK using a standard 4-way handshake. After the STA re-associates, AP B updates its neighbor graph, as illustrated in FIG. 2D.

While the neighbor graph generation and fast roaming techniques described above provide certain advantages, the approach is still problematic. The requirement that each neighbor AP have its own unique PMK as the STA roams during a given session is complex and inefficient. In particular, as more and more access points have to recompute PMKs, the network congestion increases dramatically, as does the strain on the authentication server. Moreover, the process of authenticating each neighbor AP to the AAA server is slow (e.g., up to 2-5 seconds) and, as a result, the proactive key may not be transferred to the new AP before the STA roams there, thereby disrupting the connection. This is unacceptable, especially for a voice call. Further, before the STA can use the new AP, it must generate the new PMK (in the example above, $PMK_B$) on the device. Once again, processing delays here may cause the connection to be interrupted. Finally, in the Lee et al. technique, before a given AP updates its neighbor graph to the accounting server, it first connects to the prior AP and undertakes a dialog to confirm that the STA was previously there. This inter-AP dialog is computationally inefficient.

BRIEF SUMMARY OF THE INVENTION

The present invention overcomes these and other problems associated with the prior art in several ways. According to one embodiment, a controller is used to manage the neighbor graph generation and maintenance, as well as PMK notifications. A given STA obtains a PMK when it associates with an AP in the WLAN infrastructure. A neighbor graph identifies prospective APs to which the STA may then roam. Instead of having each neighbor AP obtain its own unique PMK, however, according to the invention the PMK (obtained by the STA initially) is simply shared with the neighbor APs proactively using the information in the neighbor graph. There is no requirement that each neighbor AP obtain its own unique PMK. Further, when the STA roams to a neighbor AP, because the same PMK is being used, there is no requirement that the STA regenerate a new PMK for use with the new AP to which (after the roam) it re-associates. Further, the new AP facilitates an update to the neighbor graph implicitly by simply issuing a notification to the controller that it is now handling the STA that arrived from the prior AP; in this manner, the prior AP is confirmed as a neighbor, but there is no requirement for any inter-AP dialog before a given neighbor graph is updated. Thus, according to the invention, at initialization it is assumed by the controller that every AP is a neighbor to every other AP; as roaming occurs the neighbor graph is pruned down (to reflect the actual neighbor AP connections) using the implicit notification data.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 3A:
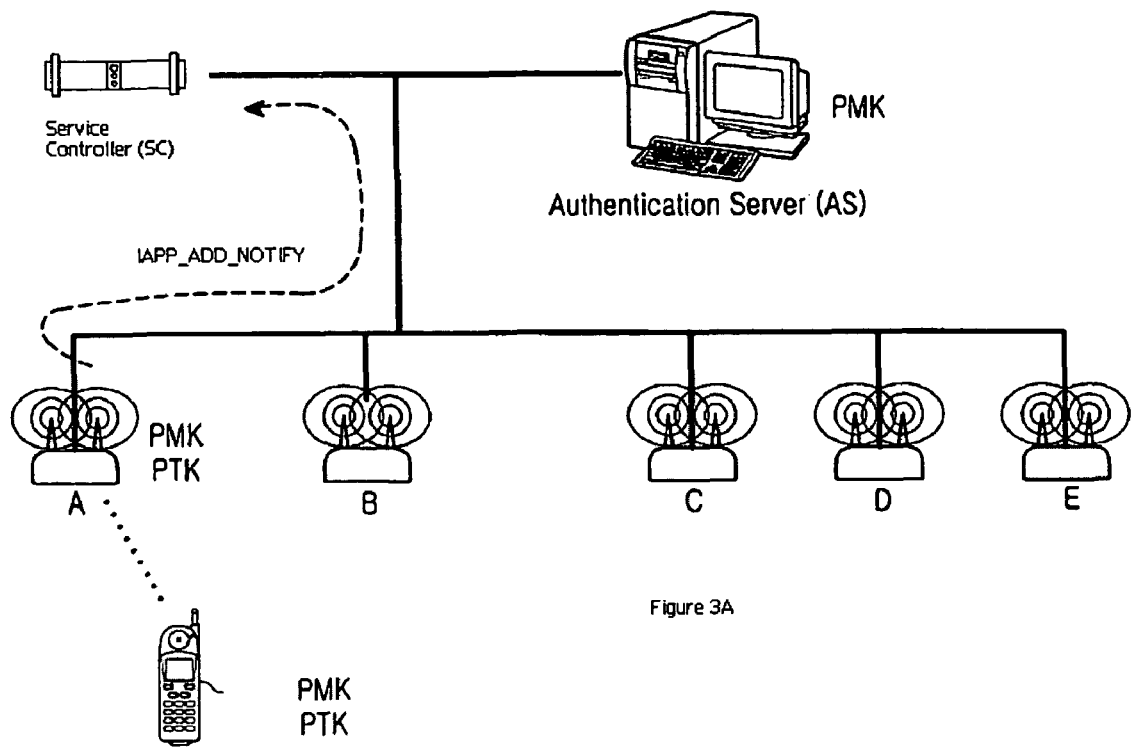
FIGS. 3A-3C illustrate a preferred embodiment of the present invention wherein a single PMK is associated with the access points within the WLAN infrastructure during a given session in which the mobile device is roaming.
Figure 3B:
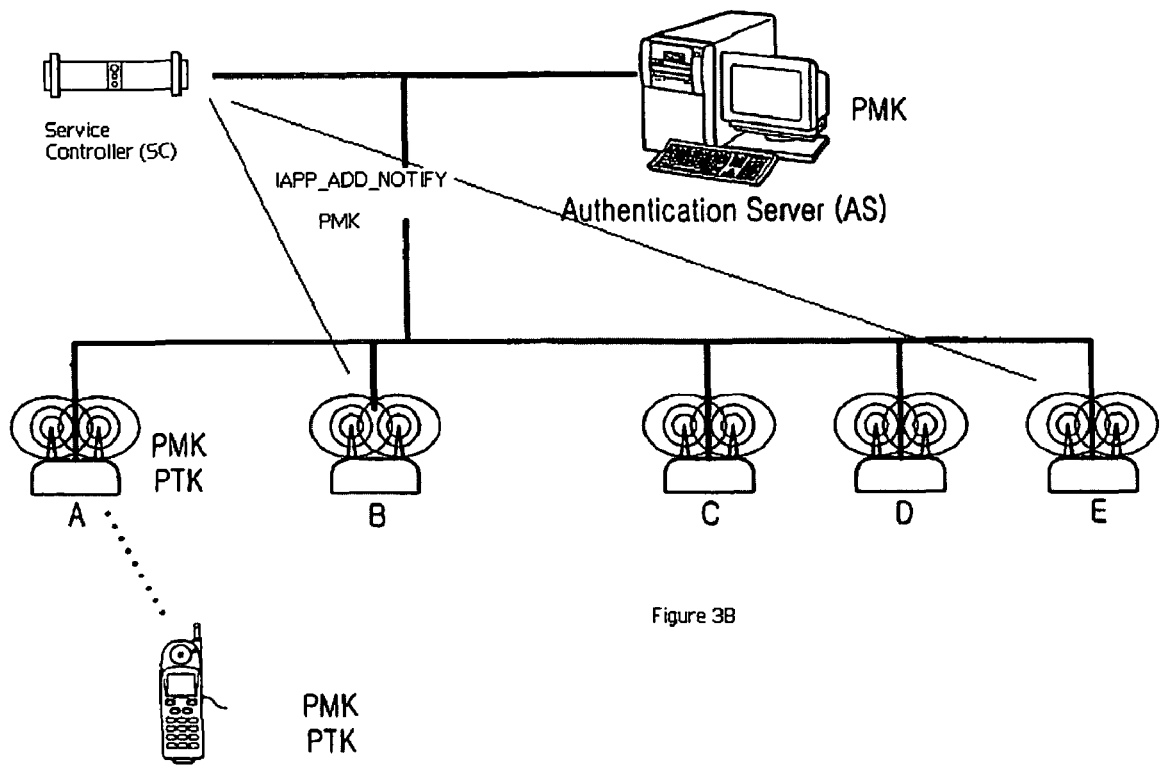
Figure 3C:
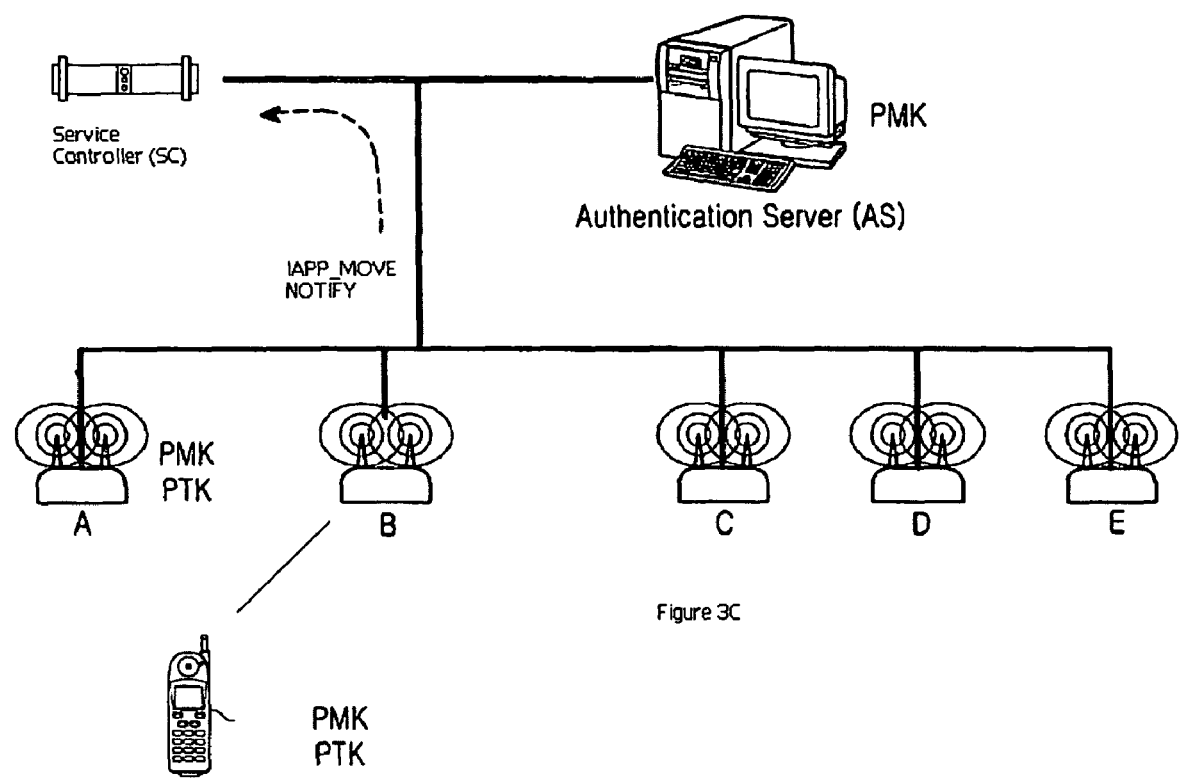

FIGS. 3A, 3B and FIG. 3C illustrate a preferred embodiment of the inventive fast roaming technique. In this example, there are five (5) access points (AP A-E) merely to conform to the prior art example. The number of APs and their configuration of course will depend on the physical constraints of the facilities in which the infrastructure is implemented. The Wi-Fi infrastructure typically also comprises an AAA server (AS) that performs RADIUS-compliant AAA services. A service controller (SC), together with control routines incorporated in the various APs, facilitates the present invention. The service controller SC may be implemented in any convenient manner, such as a personal computer, a server, or similar machine. A representative service controller is a rack-mounted PC running a Linux 2.4 (or equivalent) operating system kernel on a Pentium (or equivalent) processor, and the device includes system memory and external storage for supporting software applications and associated data. The SC also includes standard Ethernet ports and (wired and wireless) network interfaces to facilitate the functions described below. The controller exports a web-based (or equivalent) interface for administration, management and monitoring. The SC functions that implement the present invention may also be provided by other Wi-Fi infrastructure, such as the AAA server, an accounting server, or the like. The infrastructure may include additional devices (not shown). Thus, for example, a given AP (having responsibility for a subnet) may be connected to the SC through a VLAN switch, and a master VLAN switch may be used to connect one or more service controllers to the AAA server or other network infrastructure (e.g., a VoIP PBX, an IP router to the public Internet, or the like). In addition, a given SC may be connected to another SC through a router or switch to provide a larger managed infrastructure. Thus, the principles of the present invention should be considered applicable in this larger operating context as well as with respect to the more simplified embodiment described below.

A representative AP includes various software modules executing on a hardware and software platform, and suitable networking support. It may include one or more radios to facilitate the wireless connectivity. In a two radio configuration, a first radio typically is configured to be IEEE 802.11b+g compliant and the second radio is configured to be IEEE 802.11a compliant. A software-configurable dual-band radio structure of this type is merely illustrative, as it allows users with different hardware requirements to connect to the device simultaneously and to share the AP resources. The present invention also may be implemented in an access point with only a single radio interface. The access point typically comprises a pair of WLAN ports, a LAN port, and an Internet port. A LAN switch (e.g., with IEEE 802.1q and 802.1p support) interconnects these ports.

As will be seen, the service controller (SC) maintains in a database a "master" neighbor graph (or, more generally, a data structure) that defines the connections between the access points. It is assumed initially (i.e. when the device is configured or at some other initialization time) that each AP is connected to every other AP in the infrastructure; thus, initially the master graph is fully connected. As mobile devices roam throughout the infrastructure, the APs update the SC with more current information about the actual connections. (As used herein, the term "roam" is sometimes referred to as a handoff). Thus, using the update information, the SC "learns" the true connectivity, i.e., which APs are actually connected to one another and over what paths. As a result, the SC then operates to "prune" the connections (which start out as fully connected) as roaming occurs and, in particular, as the given APs notify the SC that they are now handling mobile devices that have roamed into their respective service areas. The SC also maintains a per-AP neighbor graph that identifies a given AP's neighbor APs.

Figure 1:
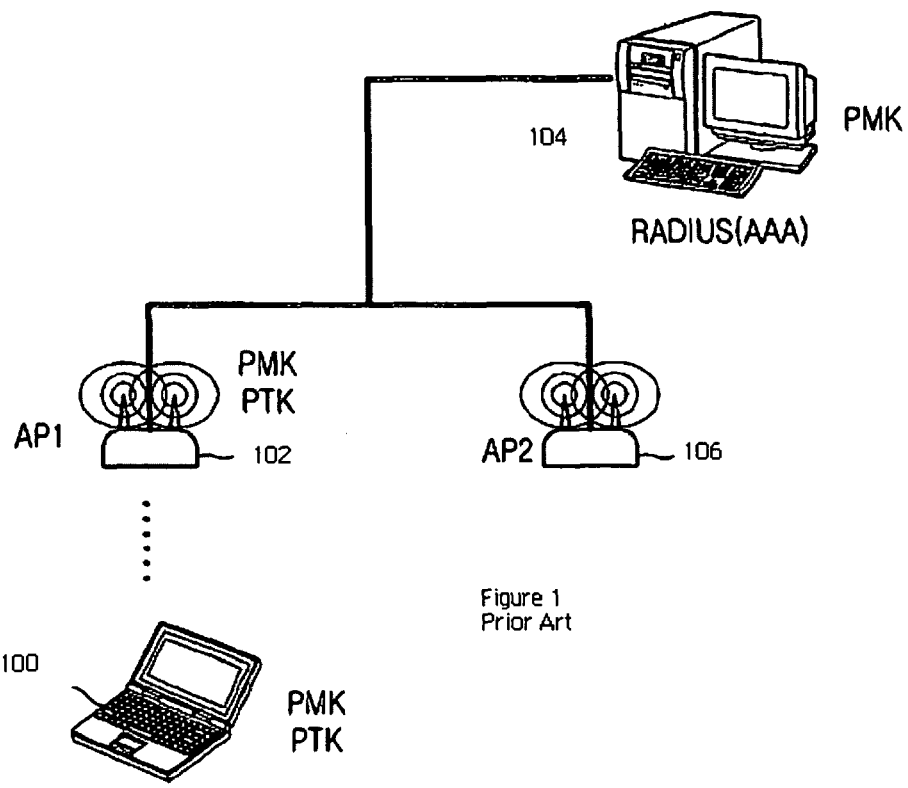
FIG. 1 illustrates a known technique for assigning a PMK to a mobile device in a wireless local area network.
Figure 2A:
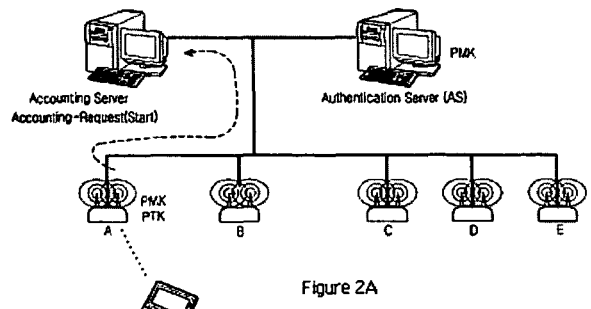
FIGS. 2A-2D illustrate a known roaming service for a wireless network in which a distinct PMK is associated with each access point within the WLAN infrastructure during a given session in which the mobile device is roaming.
Figure 2C:
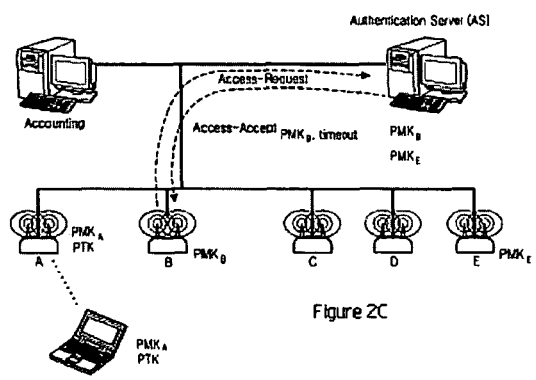
Figure 2B:
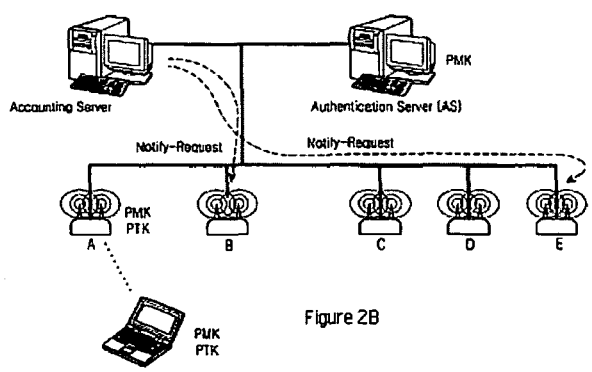
Figure 2D:
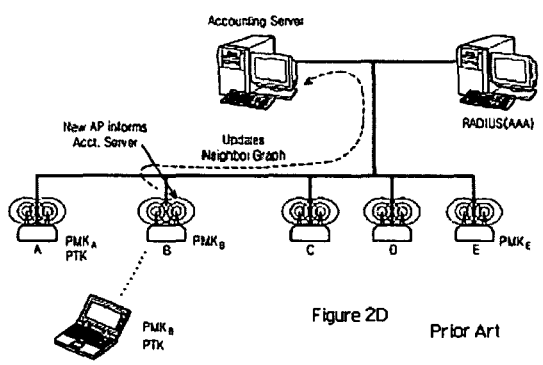

According to a feature of the present invention, once a STA authenticates to a given AP during a session, the PMK that is generated to secure that session is proactively delivered to the AP's neighbors (by the SC) for later use by the STA if and when it roams to a given neighbor. This re-use of the PMK differs from the prior art technique described above, where each neighbor AP must first obtain its own unique PMK. Thus, in comparing FIGS. 2A-2D with FIGS. 3A-3C, it should be appreciated that the procedure illustrated in FIG. 2C is unnecessary in the present invention and thus is absent. In particular, in FIG. 3A the STA is shown as authenticated to AP A, after which the AP notifies the SC of the PMK, preferably using an IAPP_ADD_NOTIFY message (familiarity with the IAPP protocol described in IEEE 802.11f is presumed). As will be described, preferably IAPP messages are encapsulated within a TLS-compliant (or equivalent, e.g., OpenVPN) encryption wrapper. In FIG. 3B, the SC consults a then-current neighbor graph (either the master or the per-AP neighbor graph), determines that AP B and AP E are neighbors, and then proactively provides the same PMK, e.g., using an IAPP_CACHE_NOTIFY message. Access points B and E are now primed to receive the STA in the event the STA roams away from AP A. In FIG. 3C, STA has roamed to neighbor AP B. As will be described in more detail below, the STA is not required to perform a real-time authentication to the AAA server; rather, the STA merely issues an EAPOL start message (familiarity with the EAPOL protocol is presumed) and receives back from AP B an EAPOL success message without proceeding with the usual (EAP-specific) exchange of credentials with the AAA server. This processing shortcut can be used because the same PMK is being shared across neighbor APs during a given session. Once the STA completes the standard IEEE 802.11i 4-way handshake, it generates the PTK and can continue the session. The AP B then facilitates the update of the neighbor graph implicitly by issuing to the SC an IAPP_MOVE_NOTIFY message. In particular, the IAPP_MOVE_NOTIFY message includes a data field that indicates the last AP visited by the STA, and the SC learns of the actual connection (in this case between AP A, the last AP visited, and AP B, the current AP) by examining the data in this field. Over time, the SC thus "learns" the true AP connectivity and prunes the neighbor graph accordingly.

Thus, unlike the prior art wherein there is a unique PMK for each AP (for a given STA during a given session), in the present invention (once again for a given STA during a given session) the same PMK is shared among the AP (to which the STA authenticates initially) and that AP's neighbors. This approach is far more efficient and reliable than the prior art technique, as it significantly reduces the number of dropped connections as the STA roams throughout the infrastructure. In addition, in contrast to the prior art, because the same PMK is being used, there is no requirement that the neighbor AP initiate a proactive request to the AAA server to generate its own unique PMK. Further, the new AP causes an update of the neighbor graph information implicitly (as opposed to requiring an explicit inter-AP dialog) by simply issuing a notification that it is now handling the STA that arrived from the prior AP; in this manner, the SC confirms that the prior AP is a neighbor to the current AP. A given AP does not have to try to determine who its neighbors actually are.

The following provides a more detailed description of a representative implementation of the present invention.

Communication Link and Security

Although the communication link between the service controller and each AP can be served by any transport protocol available, this communication link preferably uses a secure TLS tunneling protocol. Preferably, a signaling protocol running on top of the secure tunnel is also used to facilitate the key distribution process. This signaling protocol is used for APs to notify the service controller of new keying information and new neighborhood data. The service controller uses the signaling protocol to distribute the new key data to other APs in the network. In one implementation, the IAPP protocol described in IEEE 802.11f is the signaling protocol used for key notification and key distribution. Alternatively, the Control and Provisioning of Wireless Access Point (CAP-WAP) protocol can be used for this purpose.

Access Point Role

The fast roaming technique is implemented across the AP and SC, as described above. Thus, preferably each AP that provides the function includes software (or equivalent firmware-embedded instructions) to provide the described techniques. The AP code provides several functions that are now described. In particular, the AP is responsible for determining if the association from a client (a STA) is either an initial association or a re-association. For the first association and after a successful authentication and authorization phase with the AAA server, the AP sends the PMK to the service controller, preferably via the IAPP protocol over the secure link (between the AP and service controller). This was illustrated in FIG. 3A. The AP also maintains a local cache of PMKs supplied by the service controller (one PMK per STA per session). During a re-association, the AP searches its local cache and tries to locate a PMK for a re-associated client. As illustrated in FIG. 3C above, upon successfully completing the 4-way handshake that implicitly provides the authenticity of the STA, the AP also notifies the service controller of the re-association event (with the BSSID of the last AP and the BSSID of the new AP) so that the service controller can use these unique identifiers to update the neighborhood graph (and then distribute the key to each neighbor of the new AP). In an alternative embodiment, if the AP has the capability to perform a wireless scan, then the AP may perform its own neighborhood scanning and determination of the presence of other nearby APs. The resulting data then can be provided to the service controller to facilitate neighborhood graph generation (although this is not the preferred technique for doing so). Typically, an AP does not perform a neighbor scan and/or does not generate its neighbor graph directly. Thus, there is no requirement that a given AP have the capability to perform scanning or neighbor graph generation according to the invention.

Service Controller Role

As noted, the service controller (which may provide other functions) is responsible for maintaining the database of all the PMK keys in the network. The service controller listens for PMK key notification from the APs. If new key material is received (e.g., a new STA arrives and initiates a new session), the service controller updates the neighbor graph database, and it then sends the new PMK key to all APs that need to be updated. In connection with a PMK distribution, preferably the SC also passes one or more pieces of additional data: a VLAN tag, upstream L2 or L3 quality of service (QoS) settings; a Wi-Fi link QoS, and a preferred AP behavior when a STA from another subnet re-associates. As previously described, the service controller builds up the AP neighborhood information from the re-association messages from all the roamed clients in the network. This information is used to establish the neighborhood relationship between two APs. Having the neighborhood information, the service controller is able to send PMK update to the appropriate APs in the network. This helps to cut down unnecessary PMK updates to APs that have no interest in a certain PMK.

Illustrative Method of Operation

A PMK cache is created at a given AP when a client starts the authentication process. Within the AP, a module EAPOL interacts with the RADIUS-compliant AAA server, sending it authentication messages. Within the EAPOL module, there exists a state wherein a pairwise master key (PMK) is identified and then a PTK is negotiated with the wireless client. At this point, a "state" is added that takes the PMK and transfers it, along with the STA's MAC layer address, to the service controller. As noted above, preferably this transfer occurs via a secure data path, such as a TLS link The service controller listens on a known IAPP port for IAPP_ADD messages issued by the access points. Likewise, access points listen for IAPP_ADD response messages. When a client associates with a given AP, a secure connection is initiated back to the service controller over a secure tunnel. Preferably, the tunnel is pre-established. The SC updates its satellite PMK cache with the information supplied by the access point. As necessary, the SC then distributes the PMK to the neighbor APs.

Preferably, all IAPP traffic (not just the PMK distribution) takes place within the pre-established secure tunnel. Once the PMK cache has been updated with the PMK, the next phase occurs when the STA roams from one AP to another. When the client roams, there is a re-association message received at the new AP. The PMK for the STA (for the session) is already present at the new AP, as a result of being proactively distributed. When the new AP receives this message, it searches its local cache to find the PMK, bypassing the normal authentication exchange.

PMK Key Distribution

It is desirable for the key distribution algorithm to be able to quickly and accurately build up the neighborhood graph so that the key updates do not have to be broadcast to every AP in the network. On a fresh start, the neighborhood data is not yet available so key priming is a way to distribute the key to an AP proactively. To prime an AP PMK cache, the service controller preferably broadcasts a new PMK that it receives from an AP to all other APs under its control. Preferably, an AP marks this broadcast PMK as a primed PMK. An AP may have a limited PMK cache; thus, when its cache is full, the AP may elect to selectively overwrite the primed PMK keys with keys from regular neighborhood key updates. Gradually, by using the neighborhood data received from the service controller, key priming may be gradually replaced by the more targeted neighborhood key distribution.

A representative key distribution algorithm implemented in the SC is as follows. Initially, as soon as an AP joins the network, it is a target for key priming (unless, for example, it can provide the SC a neighborhood scan). The SC assumes that the AP has no neighborhood scanning ability. The SC updates the AP's neighbor graph every time there is a client roaming away from the AP or roaming to the AP. If the AP has already built up a sufficient number of neighbors (e.g., 4) over time, then it is no longer a target for key priming. (If an AP performs its own neighbor scanning and graph generation, this graph is updated every time the AP sends the scanning results to the SC). If an AP has received a large number of primed keys (e.g., 1000), then the SC removes it from the key priming target list. If the total number of APs in the network is small (e.g., less than 25), then key priming is continued indefinitely, or until a given AP has built up a sufficient number of neighbors or the AP provides its own graph (assuming it can do so). If connectivity (keep alive) to an AP is lost, the AP is removed from the key priming target list. All keys associated with this AP are deleted from the SC database, and all APs are notified of key deletion. If the SC goes out of service, existing clients are still able to run and roam within the current set of neighbors of the current AP that have already cached the STA's PMK. New clients, however, will not be able to do a fast roam until the SC comes back up. When a new SC comes up, the APs send all new keys (received after the SC went down) to the SC to re-establish and/or update the key database. This is done so that any new client that associated to the AP after the SC went down can start roaming again. The SC database can be static and sustain a re-boot. Because the PMK key information and AP neighborhood data are fairly static, the database can be re-used after a re-boot. Alternatively, the database can be cleared on a boot-up if desired.

An aim of the key distribution algorithm is to eliminate the probability of cache miss if the system has been in operation long enough for the SC to build up a complete neighborhood graph. The speed at which the neighborhood graph can be completed depends on a number of factors: i) roaming activity—the more roaming there is in the network, the faster the neighbor graph can be built up. ii) AP density—the closer the APs are together, the less there is a chance for hidden node. iii) user intervention—the user may elect to enter the neighborhood information manually.

Pruning A Fully-Connected AP Neighbor Graph

Preferably, as noted above, when the SC is initialized it identifies all APs as fully connected. Thus, from the perspective of the SC each AP is a neighbor to every other AP, although this is often not the case physically. As mobile devices roam throughout the infrastructure and, in particular, after a STA has re-associated with an AP, that AP notifies the SC of the re-association, and the re-association message includes a data field indicating the last AP that the STA visited. Over time, this last AP data is then used by the SC to prune the fully-connected neighborhood graph (as necessary) to more accurately reflect the actual AP connectivity (which AP is connected to which other AP) within the infrastructure. While this approach does incur some processing overhead at least initially, it ensures that keys are always available when the stations are roaming.

Creation of Entry for Satellite PMK Cache

The creation of a PMK entry typically is the result of the reception of an IAPP_ADD request from an AP that has detected a client association and the client is authenticated and authorized to use the WLAN. Upon reception of the message, the IAPP daemon allocates a PMK entry in the cache and populates it with data, such as: the client station address, the satellite address, SSID, a quality of service (QoS) metric, VLAN/IP tunnel, and the like. The entry is then placed on the list specific for the satellite. Once this processing is done in the service controller, the IAPP daemon sends an IAPP_ADD confirm message back to the AP that sent the IAPP_ADD request message.

Key Information Update of Satellite PMK Cache on Client Association

Updating the PMK key information takes places when the service controller receives an IAPP_CACHE_NOTIFY request. In response, the service controller searches the appropriate satellite list and finds the entry, preferably based on the client MAC address. Once the entry has been found, the service controller updates the entry with the PMK. After the update processing, the service controller sends an IAPP_CACHE_NOTIFY confirm message back to the AP that sent the service controller the IAPP_CACHE_NOTIFY request message.

Key Information Update of Satellite PMK Cache on Client Re-Association

Updating of the PMK key information takes place when the service controller receives an IAPP_MOVE_NOTIFY request. The service controller searches the appropriate satellite list and finds the entry, preferably based on the client MAC address. Once the entry has been found, the service controller updates the entry with the PMK. After the update processing, the service controller sends an IAPP_MOVE_NOTIFY confirm message back to the AP that sent the service controller the IAPP_MOVE_NOTIFY request message.

Deletion of Satellite PMK Cache Entry

When an access point determines that a client has terminated its association with the AP, the AP sends an IAPP_MOVE_NOTIFY indication message to the service controller. According to the 802.11i specification, access points exchange this message to see if the re-association is current. This message can be used to signal the service controller to delete the PMK entry.

In a preferred embodiment, when an AP detects a disassociation from a STA, the AP sends an IAPP_REMOVE message to the service controller. This message is an extension to IAPP protocol. Once the service controller receives the IAPP_REMOVE message, the controller places the STA (its MAC address) on a list. If a IAPP_MOVE message later is received containing this STA MAC address, the STA is then removed from the list. If no IAPP_MOVE message is received within a given timeout, then the service controller sends an IAPP_TERMINATE to all APs, signifying that the STA has left the network.

Roaming Protocol Signaling Flow

Figure 4:
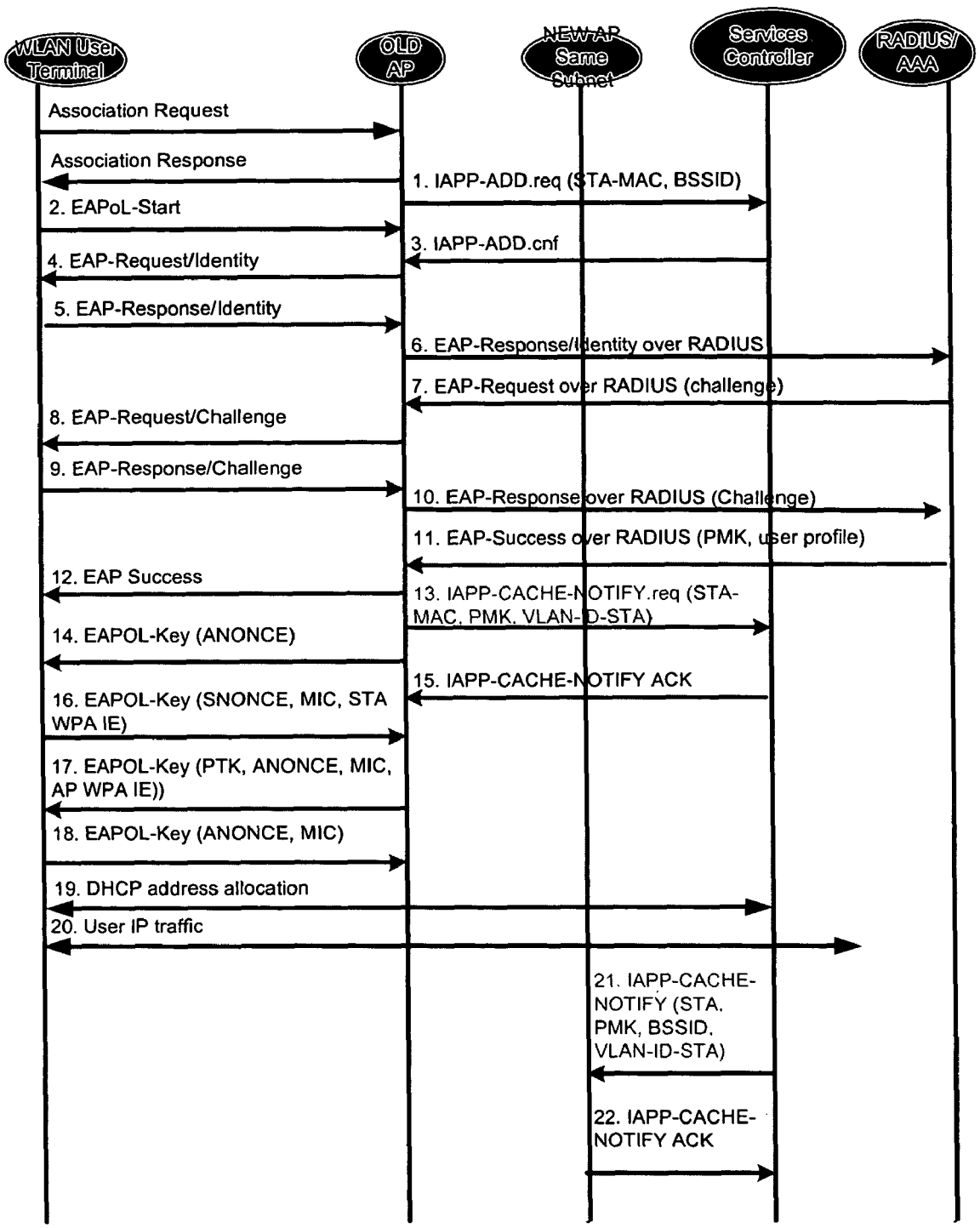
FIG. 4 illustrates a message sequence when a client mobile device completes its first association and authentication to an AP.
Figure 5:
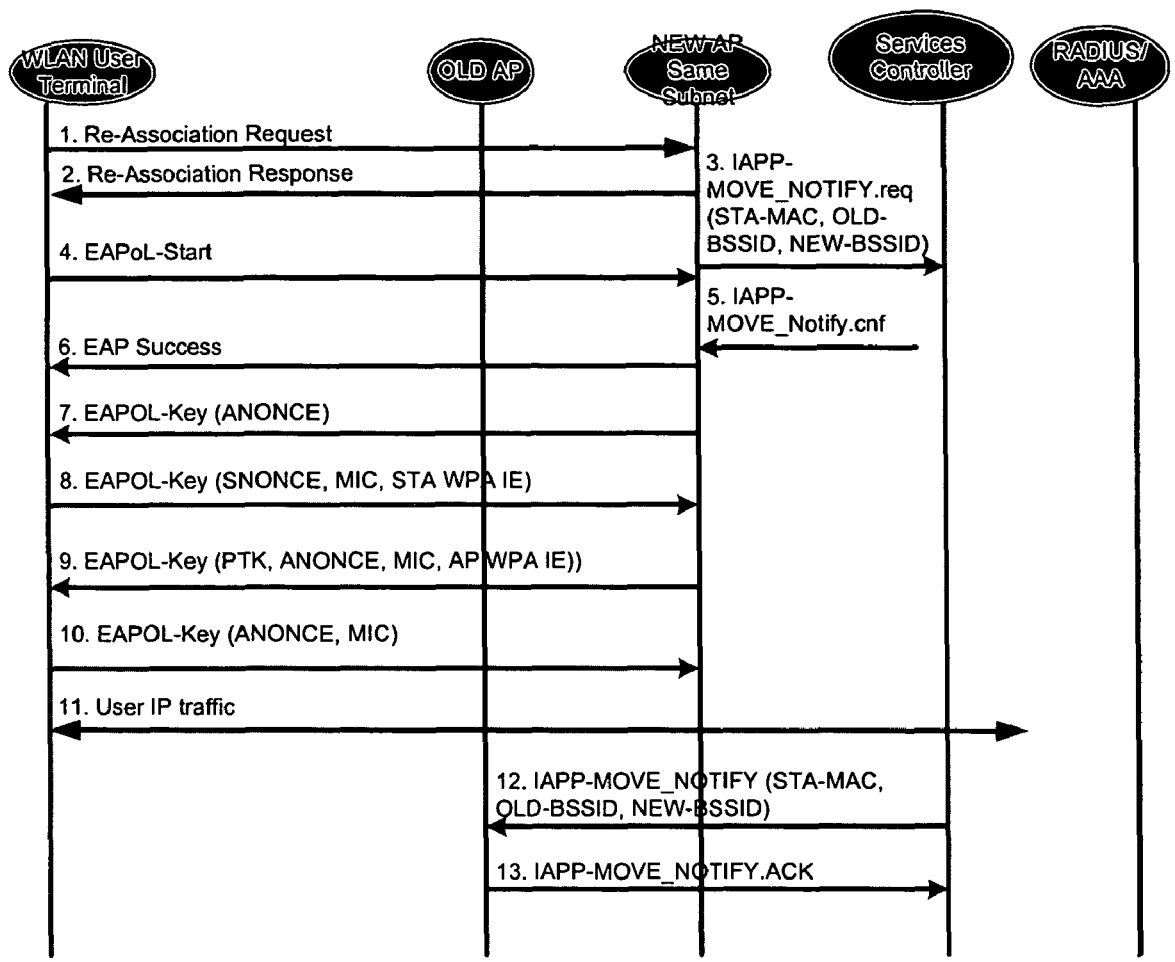
FIG. 5 illustrates a message sequence when a client roams between an AP and one of its neighbor access points.

FIG. 4 is a signaling message diagram showing the message sequence when a client completes its first association and authentication with a given AP and the subsequent key information update of the satellite PMK cache by the service controller. FIG. 5 is a signaling message diagram showing the message sequence when the client roams off of the AP to the new AP.

The present invention provides numerous advantages. Fast roaming is achieved by having a wireless client's PMK distributed to neighboring APs proactively, i.e., before the client arrives at the neighbor AP. Thus, when the client hands-off to the neighbor AP, the PMK is already there so that user data can flow as soon as possible without having to restart authentication and key distribution processes between the client and the authentication server. The service controller assumes initially (at some time $t_0$) that each AP is connected to every other AP; as the mobile devices exhibit mobility (and the APs issue re-association notification message updates), the SC learns of the true AP connectivity. As new APs are added (even after time $t_0$), the SC provides all keys to that AP (by key priming) until additional information can be learned about the AP and its physical proximity (to other APs). In this manner, keys usually are always available at the AP in advance of the STA's arrival.

Additional Variants

In a representative embodiment, WPA authentication is used to generate the PMK. This is not a limitation of the invention, however. In particular, the described method of graph and key distribution may be used in association with any other type of encryption technique including, without limitation, dynamic WEP, WPA2, and others. Familiarity with techniques is presumed. Thus, for example, in the case of WPA2, preferably the STA maintains a cache of the PMKs, and the STA sends to the AP a PMK identifier (PMKID) associated with the PMKs in its cache. If there is a matching PMKID at the AP, the AP returns to the STA a successful re-association response and the 4-way handshake can start right away.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. As noted above, a given implementation of the present invention is software written in a given programming language that runs on a standard hardware.

While given components of the system have been described separately, one of ordinary skill will appreciate that some of the functions may be combined or shared in given instructions, program sequences, code portions, and the like.

Having described our invention, what we now claim is as follows:

1. In a wireless network having a set of access points (APs) each having a predetermined service area, a station (STA) that receives a communication service by associating with APs in the set, an authentication server (AS) that authenticates the STA, and a controller that maintains a data structure identifying prospective APs to which the STA may roam, a method, comprising:
   associating the STA to a first AP by obtaining a security key from the AS;
   after the first AP reports to the controller that the STA has associated to the first AP using the security key obtained from the AS, forwarding the security key to the controller;
   while the STA is associated with the first AP, forwarding the security key from the controller to at least a second AP in the set as identified by the data structure;
   re-associating the STA at the second AP using the security key and without requiring the STA to authenticate back to the AS;
   after re-associating, updating the data structure by notifying the controller that the first AP is a neighbor of the second AP; and
   providing to any new AP that is added to the set of APs all of the security keys associated with the stations in the wireless network,
   wherein, at a given time, the data structure is fully-connected, thereby indicating that each AP in the set of APs is directly connected to every other AP in the set of APs.

2. The method as described in claim 1 wherein the security key is forwarded over a secure link using a given message protocol.

3. The method as described in claim 2 wherein the secure link is TLS and the given message protocol is IAPP.

4. The method as described in claim 1 wherein the step of updating the data structure optionally removes at least one connection from the fully-connected data structure.

5. The method as described in claim 1 wherein the security key is forwarded from the controller to every AP in the set as identified by the data structure.

6. The method as described in claim 1 wherein the controller is notified that the first AP is a neighbor of the second AP without having the first AP and the second AP communicate with one another directly.

7. A controller for use in a wireless network, the network having a set of access points (APs) each having a predetermined service area, wherein mobile stations (STA) receive a communication service by associating with APs in the set, and wherein an authentication server (AS) is used to authenticate the mobile stations, comprising:

a data store in which a data structure is stored, the data structure comprising a connection graph describing how each AP in the set of access points is connected to other APs in the set;

code, executable by a processor, responsive to receipt of an association message that the station has associated to a first AP using a security key obtained from the AS, for receiving the security key from the first AP and forwarding the security key to a set of one or more other APs in the set as identified in the connection graph, code, executable by the processor, responsive to receipt of a re-association message from a second AP that indicates that the station has associated with the second AP, for updating the connection graph to indicate that the second AP is connected to the first AP, and code, executable by the processor, for providing to any new AP that is added to the set of APs all of the security keys associated with the stations in the wireless network.

8. The controller as described in claim 7 wherein the connection graph is fully connected at a given time, thereby indicating that each AP in the set of APs is connected to every other AP in the set of APs.

9. The controller as described in claim 8 wherein the code responsive to receipt of the re-association message updates the connection graph as required to indicate that the second AP is connected to the first AP by removing at least one connection from the connection graph.

10. The controller as described in claim 8 wherein the code responsive to receipt of the message from the station also receives a MAC address of the STA.

11. The controller as described in claim 7 further including code, executable by the processor, for establishing and maintaining a secure link between the controller and a given AP, whereby the association message and the re-association message are communicated over the secure link.

12. A system, comprising:
a set of access points, each access point having a predetermined service area; and a controller, comprising:
a data store in which a data structure is stored, the data structure comprising a connection graph describing how each AP in the set of access points is connected to other APs in the set;

code, executable by a processor, responsive to receipt of a first message that the station has associated to a first AP using a security key, for receiving the security key from the first AP and forwarding the security key to a set of one or more other APs in the set as identified in the connection graph, and code, executable by the processor, responsive to receipt of a second message from a second AP that indicates that the station has associated with the second AP, for updating the connection graph to indicate that the second AP is connected to the first AP;

wherein the second AP comprises code, executable by a processor, for receiving from the station a third message and responding to the third message with a fourth message so that the station is not required to obtain a new security key, and for thereafter issuing the second message to the controller, wherein the second message includes a data field indicating that the station last visited the first AP.

13. The system as described in claim 12 wherein the connection graph in the data store of the controller is fully connected at a given time, thereby indicating that each AP in the set of APs is connected to every other AP in the set of APs.

14. The system as described in claim 13 wherein the code responsive to receipt of the second message updates the connection graph as required to indicate that the second AP is connected to the first AP by removing at least one connection from the connection graph.

15. The system as described in claim 12 further including an authentication server for issuing the security key.

16. The system as described in claim 15 wherein the authentication server is RADIUS-compliant.

17. The system as described in claim 12 wherein each access point communicates with the controller over a secure link using a given message protocol.

18. The system as described in claim 17 wherein the secure link is TLS and the given message protocol is IAPP.

* * * * *